United States Patent [19]
Adams

[11] Patent Number: 5,773,114
[45] Date of Patent: Jun. 30, 1998

[54] RADIAL ARC FABRIC SPLICE FOR FABRIC CONVEYOR BELTS

[75] Inventor: Anthony Dennis Adams, Fairlawn, Ohio

[73] Assignee: The Goodyear Tire & Rubber Company, Akron, Ohio

[21] Appl. No.: 756,968

[22] Filed: Nov. 15, 1996

[51] Int. Cl.⁶ .................................................. B32B 3/00
[52] U.S. Cl. ................... 428/57; 198/844.2; 198/848; 198/849; 428/58; 428/59; 428/60; 428/61
[58] Field of Search ................................ 428/57, 58, 59, 428/60, 61; 198/844.2, 848, 849

[56] References Cited

U.S. PATENT DOCUMENTS

| | | | |
|---|---|---|---|
| 2,506,915 | 5/1950 | Bishop | 428/60 |
| 4,082,521 | 4/1978 | McGarvey | 428/57 |
| 4,427,107 | 1/1984 | Roberts | 428/60 |
| 5,348,782 | 9/1994 | Arnold | 428/60 |
| 5,514,436 | 5/1996 | Schlueter | 428/57 |

*Primary Examiner*—Nasser Ahmad
*Attorney, Agent, or Firm*—Marc R. Dion, Sr.

[57] ABSTRACT

A splice for a fabric reinforced conveyor belt comprising a fabric layer having mating ends cut as an arc of a circle having a radius whose length is greater than the width of the fabric. There is also provided a fabric reinforced conveyor belt comprising: a) a pulley cover; b) at least one layer of fabric reinforcement; and (c) a top cover, wherein the fabric layer has a splice as described immediately above.

4 Claims, 3 Drawing Sheets

RADIAL ARC FABRIC SPLICE FOR FABRIC CONVEYOR BELTS

FIELD OF THE INVENTION

This invention relates to fabric splices for fabric reinforced conveyor belts.

BACKGROUND OF THE INVENTION

Heretofore, various configurations have been used for splicing complementary ends of conveyor belts. See e.g. U.S. Pat. Nos. 4,235,120; 4,279,676; 5,275,858; 5,377,818 and 5,531,316. Most advocate the use of a bias cut butt splice or an arrangement where various layers are cut to various lengths and mated together.

In order to determine the stress/strain characteristics of these conventional splices, finite element analyses were run on fabric models as illustrated in FIGS. 3–5 with FIG. 3 representing the control of a single piece of fabric (24) 122 cm wide by 152 cm long without a splice. FIG. 4 illustrates a fabric (26) having the same dimensions as in FIG. 3 with a bias splice at 60° C. across the width (W) from the longitudinal direction. The two ends of the splice were joined by applying a thin layer of rubber (32) and a piece of fabric (34), both being 20 cm wide.

FIG. 5 illustrates a fabric (28) having the same dimensions as in FIG. 3 with a V-shaped splice of 130° C. between the legs of the V. The two ends of the splice were covered with a V-shaped thin layer of rubber (36) and a piece of V-shaped fabric (38), both being 20 cm wide.

Each of the models was simulated to be secured along one of its widths in a stationary manner while a stress was created by pulling the other end a distance of 30.5 cm.

For the control fabric (24) of FIG. 3, the analysis showed high stresses and strains in the corners due to an hour glass effect that occurs when the fabric is stretched and necks in. The maximum principal stress was 552 kPa and the maximum principal strain was 20%.

For the bias spliced fabric (26) of FIG. 4, the analysis showed a pattern of stress and strain levels within the fabric and rubber that would cause the fabric layer to pull to one side due to the imbalance of the stiffness in the splice area. The maximum principal stress was 1110 kPa which was 100% higher than the control. The maximum principal strain was 26.1% or 33% higher than the control. The stress levels and the unusual pulling effect exhibited by this splice suggests that it be ruled out for fabric reinforced conveyor belts.

For the V-shaped spliced fabric (28) of FIG. 5, the analysis showed a pattern of stress and strain that would cause a puckering effect just in front of the tip of the V. The maximum principal stress level was 931 kPa or 69% higher than the control. The maximum principal strain level was 24.4% or 22 percent higher than the control.

In view of the unbalanced results and puckering shown above, a splice shape was conceived to provide a more even pattern of stresses and strains and to eliminate the undesirable results above.

As illustrated in FIG. 6, a fabric (30) having the same dimensions as FIG. 3 was cut to have a splice which was an arc of a circle having a radius R of 152 cm. The two ends of the cut were joined with a thin layer of arc shaped rubber (40) and an arc shaped piece of fabric (42). The finite element analysis showed a constant pattern of stresses and strains which would eliminate any puckering or unbalanced side effects. The maximum principal stress level was 917 kPa or 68% higher than the control. The maximum principal strain level was 23.40 or 17 higher than the control.

SUMMARY OF THE INVENTION

In accordance with the practice of the present invention there is provided a splice for a fabric reinforced conveyor belt comprising a fabric layer having mating ends cut as an arc of a circle having a radius whose length is greater than the width of the fabric. There is also provided a fabric reinforced conveyor belt comprising: a) a pulley cover; b) at least one layer of fabric reinforcement; and (c) a top cover, wherein the fabric layer has a splice as described immediately above.

DETAIL DESCRIPTION OF THE INVENTION

Figure 1:
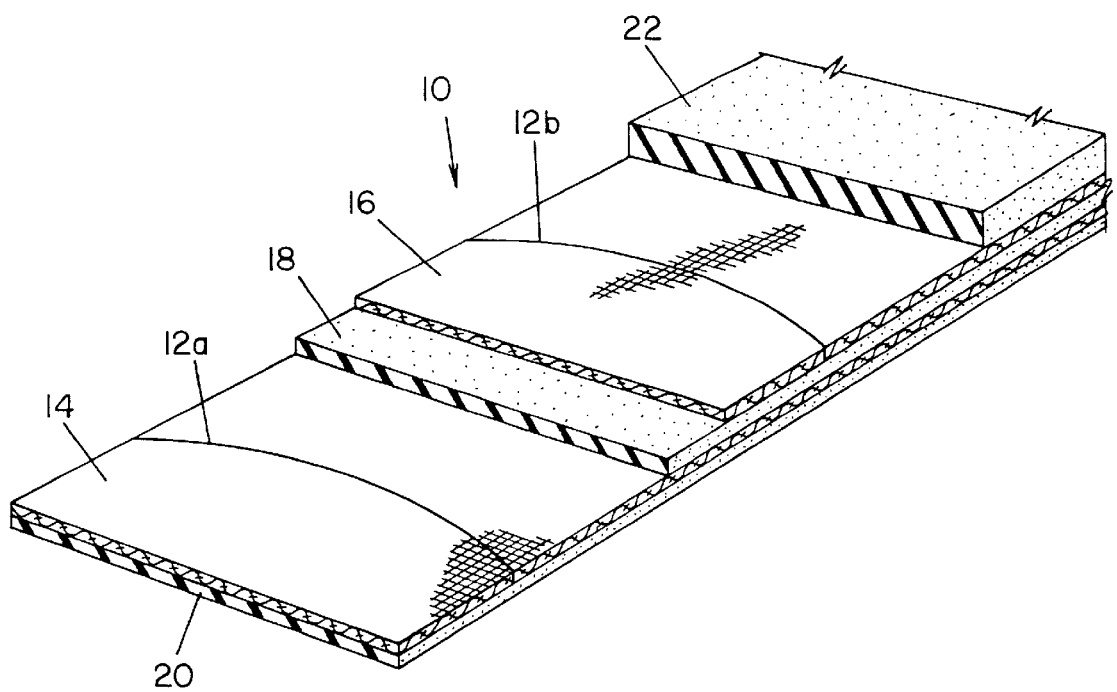
FIG. 1 is a perspective view of a conveyor belt having fabric layer splices according to the invention with layers cut-away.
Figure 2:
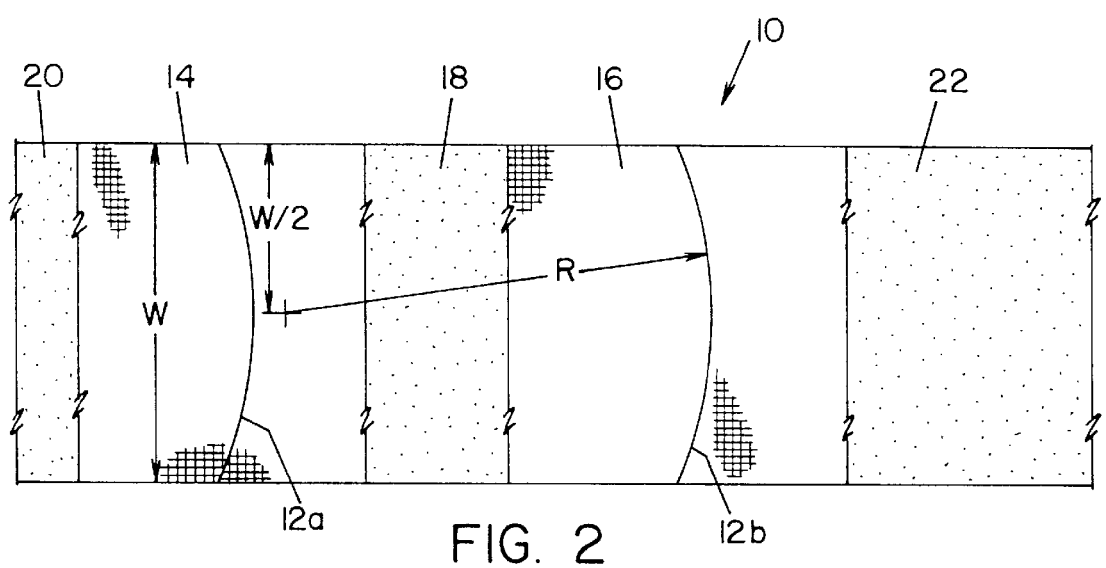
FIG. 2 is a plan view of FIG. 1.
Figure 3:
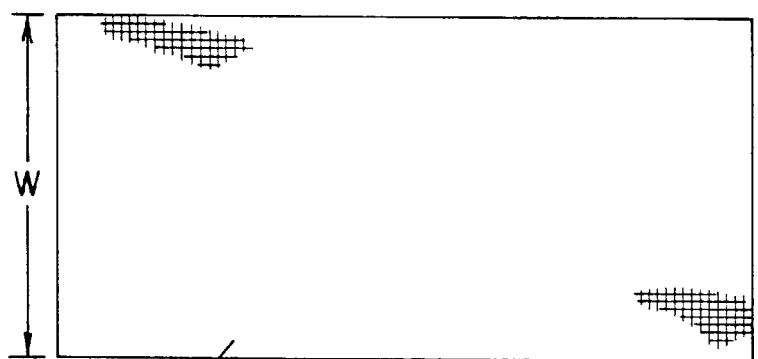
FIG. 3 is a plan view of a control finite element analysis model.
Figure 4:
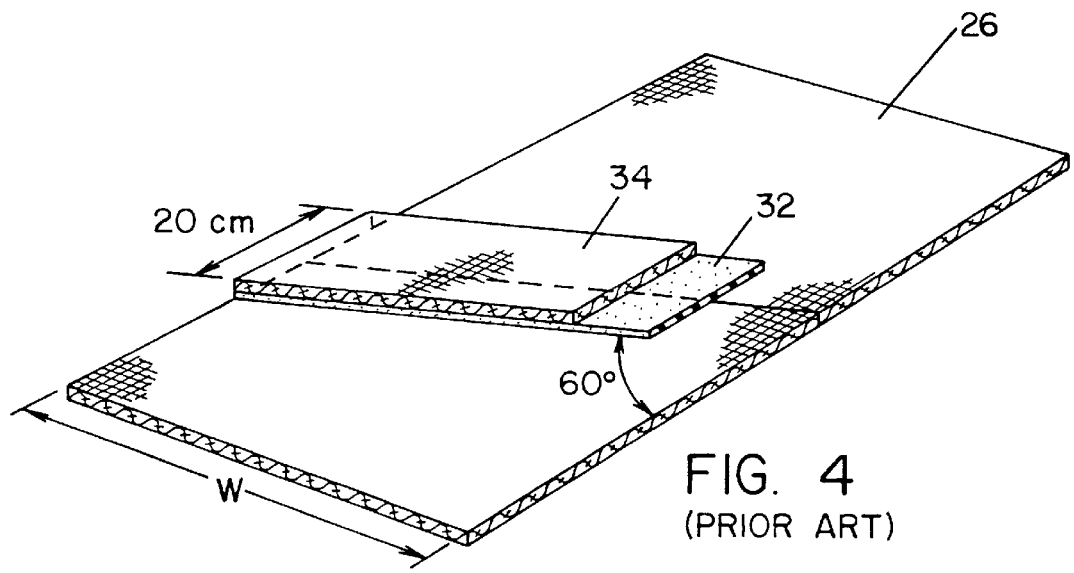
FIGS. 4 and 5 are plan views of a finite element analysis models of prior art fabric splices.
Figure 5:
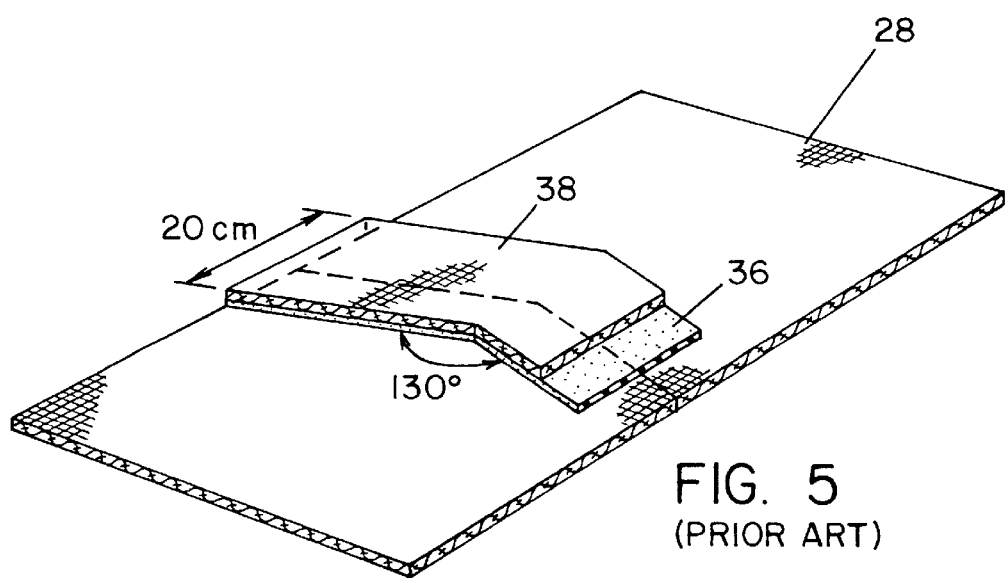

FIGS. 1 and 2 illustrate a fabric reinforced conveyor belt shown generally at (10) having arc shaped splices (12a) and (12b) wherein the radius (R) of the arc has a length which is greater than the width (W) of the fabric. It is preferred that the radius (R) be from 1.16 to 2.0 times the width (W) of the belt. While there is shown a belt having two plies of fabric (14) and (16), belts are contemplated with only one layer of fabric as are those having more than two layers of fabric reinforcement. The two-layer belt illustrated is to show the preferred embodiment that the splices (12a) and (12b), in adjacent layers of multi-layered belts, be offset longitudinally from each other in order to avoid the addition of stress levels at the same location.

Figure 6:
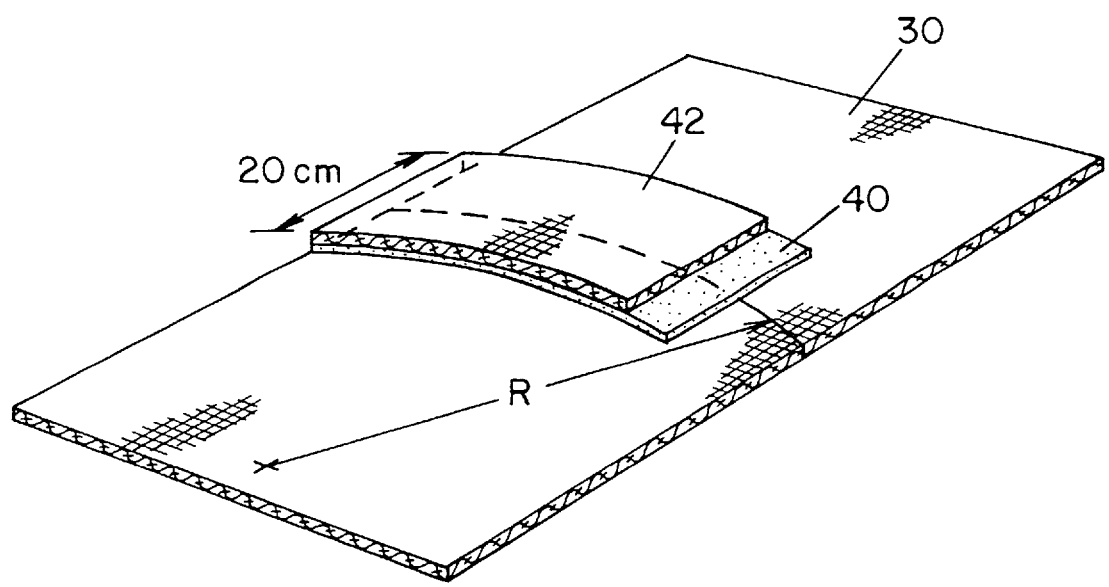
FIG. 6 is a plan view of a finite element model fabric of the present invention.

In addition to the splice defined above, the belt can include a thin layer of rubber (40) and a layer of fabric (42) as shown in FIG. 6, particularly for belts having a single layer of fabric reinforcement. For belts having more than one layer of reinforcement, the intermediate polymeric layer (18) would serve the same function.

A belt constructed according to the invention would generally have a pulley cover (20) and a top cover (22).

While certain representative embodiments and details have been shown for the purpose of illustrating the invention, it will be apparent to those skilled in this art that various changes and modifications may be made therein without departing from the spirit or scope of the invention.

What is claimed is:

1. A splice for a fabric reinforced conveyor belt comprising a fabric layer having mating ends cut as a single arc of a circle having a radius whose length is greater than the width of the belt.

2. The splice according to claim 1 further comprising a thin layer of rubber bridging the mating fabric ends and a strip of fabric to cover the rubber layer.

3. The splice according to claim 1 wherein the radius has a length which is from 1.16 to 2.0 times the width of the belt.

4. A splice for a fabric reinforced conveyor belt comprising having mating ends of the fabric cut as a single arc of a circle having a radius whose length is from 1.16 to 2.0 times the width of the conveyor belt.

* * * * *